2,954,374

NOVEL STEROID INTERMEDIATES

Edward Robert Townley, West Paterson, N.J., assignor to Schering Corporation, Bloomfield, N.J., a corporation of New Jersey No Drawing. Filed Aug. 14, 1959, Ser. No. 833,708

6 Claims. (Cl. 260—239.55)

This invention relates to a new steroidal substance and to methods for its preparation. In particular it pertains to 12β-hydroxy-diosgenin (22α,25D-spirost-5-ene-3β,12β-diol) which serves as a valuable precursor in the synthesis of cortisone, hydrocortisone, prednisolone, 9α-fluoroprednisolone, the sex hormones, and related steroidal compounds.

This new compound is synthesized from saponins in certain plant tissues, particularly the tubers of *Dioscorea spiculiflora*. It has hence been given the name "spiculigenin" and assigned the following structure:

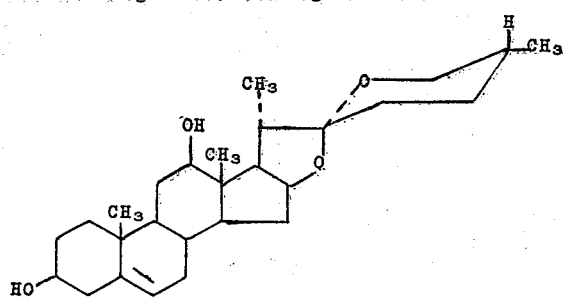

It can be seen from the above formula that the presence of three structural features on the basic steroid nucleus render this new sapogenin as a valuable starting material for the synthesis of cortisone and related corticoids. These features are namely (1) the 3-hydroxy-5,6-dehydro system which is readily convertible to the 3-keto-4-dehydro system of cortisone; (2) the side chain at C–17 which can be transformed to the dihydroxyacetone side chain present in the corticoids; and (3) the hydroxy function at C–12 which by virtue of its adjacency, facilitates the introduction of an oxygenated C–11 function. With these structural features already present in the starting steroidal substance, there is thus eliminated from the corticoid synthesis sequence those steps which would otherwise be necessary for their introduction.

Spiculigenin may thus serve as a precursor for valuable steroid intermediates by effecting a number of minor transformations. For example, treatment of the purified sapogenin with one equivalent of a carboxylic acid anhydride yields the corresponding 3-ester. Treatment with a suitable oxidizing agent such as chromic acid, then yields the corresponding 12-keto compound, gentrogenin 3-carboxylic acid ester, a compound which is readily convertible to valuable corticoids, sex hormones and similar steroid compounds by known methods.

While the hemisuccinate is the preferred ester for protection of the hydroxyl group in the 3-position of spiculigenin other lower alkanoic acid radicals may be similarly used as for example the acetate, propionate, and the like.

Spiculigenin is separated together with other sapogenins from the non-steroidal substances of the plant material by employing extraction and hydrolysis techniques. A suitable procedure involves an aqueous alcohol extraction of the finely divided plant material, removal of fat soluble substances by washing with benzene, isolation of the fat-free mixture of saponins by extraction with butanol, and finally acidic hydrolysis to cleave the saponin into its sapogenin moiety and sugar moiety.

Starting with plant material from *Dioscorea spiculiflora* for example and following such a procedure yields a mixture of sapogenins which, in addition to spiculigenin, contains mostly diosgenin and gentrogenin together with smaller amounts of other sapogenins such as yamogenin and correllogenin.

The separation of spiculigenin from this mixture of sapogenins is best effected by extraction methods. This type of separation insures almost complete recovery of all components of the sapogenin mixture, many of which are themselves valuable starting materials for various steroid synthesis. The method of preference involves a two phase system which is suitable for either small scale batch extraction or large scale counter-current extraction. By employing a suitable solvent system it is possible to separate those sapogenins containing an oxygen function in the C-ring of the steroid nucleus from those devoid of an oxygen function in the C-ring. Such a suitable system comprises aqueous methanol and a chloroform solution of heptane. The precise concentrations of individual mixed solvents may vary depending upon the nature of the sapogenins present. Aqueous methanolic solutions ranging from 70 to 90% methanol by volume and chloroform solutions of 70 to 90% heptane by volume are generally suitable. While an increase in the percentages of methanol and/or chloroform will increase the solubilities of the various sapogenins, it also decreases the effectiveness of the separation. Similarly while an increase in the amount of water and/or heptane will improve separation there is also a concurrent decrease in the solubilities of the various sapogenins.

I have found the system composed of an approximately 81% aqueous methanol solution as one component and a 90% heptane in chloroform solution as the other component to be highly effective. Under these conditions spiculigenin is found in the methanol layer together with gentrogenin and with small amounts of correllogenin while diosgenin is isolated from the chloroform-heptane layer together with small amounts of yamogenin.

The mixture of sapogenins obtained from the aqueous methanol layer may be separated into other components by a second fractional liquid extraction. The solvent system as described for the first extraction is employed, preferably using however a lower concentration of methanol and heptane. For example, an extraction is performed upon sapogenins obtained from the methanolic phase of the first extraction employing 73% aqueous methanol as one phase and a 73% solution of heptane in chloroform as the other and there is thus obtained from the methanolic layer upon concentration essentially pure spiculigenin.

The following examples will serve to illustrate suitable methods for the preparation of spiculigenin. These examples however should not be construed as limiting the scope of this invention, the scope being limited only by the appended claims.

EXAMPLE 1

*Isolation of sapogenins*

(A) Approximately 30 kg. of finely divided tuber material *Dioscorea spiculiflora* are placed in an extraction apparatus and extracted with 60 l. of refluxing 95% isopropyl alcohol for one hour. The alcohol extracts are cooled, removed from the apparatus and the extraction repeated twice. The combined alcoholic extracts are then concentrated at atmospheric pressure to approximately 18.5 l. This concentrate is then adjusted to a pH of 4.0 by the addition of hydrochloric acid, after which 1.0 kg.

of sodium chloride are added. The essentially aqueous suspension is washed four times with 2 l. portions of benzene and next extracted seven times employing 3 l. portions of n-butanol. The combined butanol extracts are washed once with 5.0 l. of 5% aqueous sodium chloride solution and the sodium chloride solution in turn is washed with an equal volume of butanol. To the combined butanol solutions are added 14 l. of water and the resulting mixture distilled until all the butanol is removed. The residue consisting of approximately 7.5 l. of aqueous suspension of the mixed saponins is used in part B of this example without further purification.

(B) To the aqueous suspension prepared in part A of this example is added 2.5 l. of ethanol and 2.5 l. of 9.9 N hydrochloric acid. The acidic solution is refluxed for four hours, cooled and filtered. The solid so collected is washed well with water and then added to a mixture of 400 g. of potassium hydroxide in 2 l. of methanol and 6 l. of benzene. This mixture is then refluxed for 15 minutes and the solution allowed to cool after which time it is filtered. The solid so collected is extracted twice with 4 l. portions of benzene and then discarded. To the filtrate is added 2 l. of water and the layers are then separated. The organic layer is then added to the benzene extracts of the solid while the aqueous layer is extracted with an additional portion of benzene and then discarded. All the benzene extracts are then combined and concentrated in vacuo to yield a mixture of the sapogenins.

EXAMPLE 2

*Isolation of spiculigenin*

(A) The counter-current extraction of spiculigenin from the mixture of sapogenin as prepared in Example 1 is effected by use of a Scheibel liquid-liquid extraction column. A solvent system is prepared consisting of 37.5% methanol, 8.5% water, 48.4% heptane and 5.9% chloroform. All the solvents are measured volumetrically and are thoroughly mixed to effect equilibration. The two layers are separated and the heavier methanol water layer is introduced into the top of the column while the lighter layer consisting of heptane and chloroform is introduced into the bottom of the column. Five hundred grams of the sapogenin mixture prepared in Example 1 are then introduced into the center of the column in a concentrated chloroform solution and counter-currently extracted therein until samples of the extraction solvents show no appreciable residue upon concentration.

(B) The aqueous methanol layer is then concentrated to approximately 5 l. and the solid thereupon precipitated is removed by filtration. The filtrate is then evaporated to dryness and decolorized by dissolving in 100 ml. of chloroform and passing the resultant solution over a column consisting of 1 g. of magnesium silicate and 0.1 g. of activated charcoal for every 1 g. of steroid solid. The solution which is eluted with chloroform is then evaporated to dryness, the resulting solid consisting essentially of spiculigenin and gentrogenin.

(C) The solid thus obtained is then subjected to a second counter-current extraction as described in part A of this example employing however a solvent system consisting of 13.5% water, 36.5% methanol, 13.5% chloroform, and 36.5% heptane. Following the procedure as therein described, there is formed upon concentration of the aqueous methanol layer a precipitate consisting essentially of spiculigenin. The solid so obtained is then recrystallized twice from acetone and once from methanol to yield pure spiculigenin, M.P. 247–248° C. $[\alpha]_D^{25}$ (dioxane) —119°.

*Analysis.*—Calcd. for $C_{27}H_{42}O_4$: C=75.30, H=9.83. Found: C=75.50, H=9.90.

EXAMPLE 3

*Spiculigenin 3-hemisuccinate*

To a solution of 44.0 g. of spiculigenin in 150 ml. of pyridine are added 10.0 g. of succinic anhydride. The mixture is stirred rapidly for a few minutes and then allowed to stand overnight at room temperature. It is finally heated on the steam bath for one hour. The solution is then poured into an equal volume of water and mixture extracted with methylene chloride. The resulting organic extracts are washed once with water and then dried over magnesium sulfate. Removal of drying agent and evaporation to dryness of the methylene chloride solution yields crude spiculigenin 3-hemisuccinate which is recrystallized from heptane.

In a similar manner, by substituting equivalent amounts of other lower alkanoic acid anhydrides such as acetic anhydride, propionic anhydride, and the like for succinic anhydride in the above procedure, there are prepared spiculigenin 3-acetate, spiculigenin 3-propionate, and the like.

EXAMPLE 4

*Gentrogenin*

To 5.2 g. of spiculigenin 3-hemisuccinate in 400 ml. of acetone at 10° is added rapidly with stirring 3.0 ml. of a standard chromic acid reagent which is prepared from 26.72 g. of chromic acid, 23 ml. of concentrated sulfuric acid and enough water to bring the solution volume to 100 ml. The reaction mixture is maintained under a nitrogen atmosphere. After five minutes of stirring, 2 l. of water is added and the crude, precipitated gentrogenin hemisuccinate is collected by filtration. The gentrogenin ester is added to an equal weight of sodium hydroxide in sufficient methanol to dissolve the solids. The solution is stirred for 6 hours, then poured into 50 ml. of water and the mixture extracted with methylene chloride. The methylene chloride extracts are washed with 5% aqueous hydrochloric acid, then with water and finally dried over magnesium sulfate. The dried solution is then evaporated to dryness and the solid recrystallized from heptane to yield gentrogenin.

I claim:

1. Compounds having the formula:

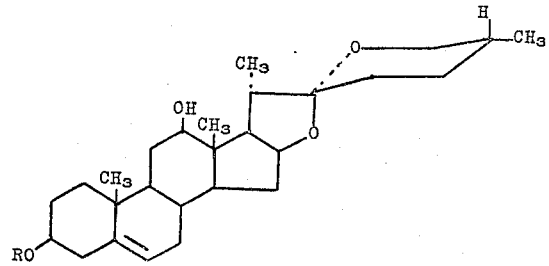

wherein R is a member of the group consisting of hydrogen hemisuccinoyl and lower alkanoic acid radicals.

2. 22α,25D-spirost-5-ene-3β,12β-diol.
3. 22α,25D-spirost-5-ene-3β,12β-diol 3-hemisuccinate.
4. 22α,25D-spirost-5-ene-3β,12β-diol 3-acetate.
5. 22α,25D-spirost-5-ene-3β,12β-diol 3-propionate.
6. In the process for the isolation of spiculigenin (22α, 25D-spirost-5-ene-3β,12β-diol), the steps which comprise subjecting a spiculigenin-bearing mixture of sapogenins to a plurality of counter-current extractions employing a two-phase solvent system, one of said phases comprising 70 to 90% methanol in water, the other of said phases comprising 70 to 90% heptane in chloroform; and isolating the spiculigenin thereby extracted.

References Cited in the file of this patent

UNITED STATES PATENTS

| | | |
|---|---|---|
| Re. 23,008 | Wagner | June 15, 1948 |
| 2,830,986 | Walens et al. | Apr. 15, 1958 |
| 2,899,428 | Rothman et al. | Aug. 11, 1959 |

OTHER REFERENCES

Wall et al.: J. Biol. Chem., vol. 192, pages 533–543 (1952).